UNITED STATES PATENT OFFICE.

GEORGE WASHINGTON CHRISTOPHER, OF PARIS, TEXAS, ASSIGNOR OF ONE-HALF TO JAMES M. GRANT, OF DEPORT, TEXAS.

LINIMENT.

SPECIFICATION forming part of Letters Patent No. 324,919, dated August 25, 1885.

Application filed March 27, 1885. (No specimens.)

*To all whom it may concern:*

Be it known that I, GEORGE W. CHRISTOPHER, a citizen of the United States, residing at Paris, in the county of Lamar and State of Texas, have invented a new and useful Improvement in Medical Compounds, of which the following is a specification.

My invention relates to a compound for the treatment of diseases of the kidney, rheumatism, neuralgia, diarrhea, dysentery, cramps, colic, and pains, and dyspepsia; and it consists in the following ingredients, in about the proportions specified: alcohol, one-fourth gallon; spirits of turpentine, one half ounce; spirits of camphor, one and one-fourth ounce; aqua ammonia, two and one-eighth ounces; tincture of opium, two and one-eighth ounces; chloroform, one-fourth ounce; tincture of ginger, one and one-fourth ounce; oil of sassafras, one and one-fourth ounce; balsam fir, one-fourth ounce; essence of peppermint, one and one-fourth ounce; black pepper, (powdered,) one and one-fourth ounce; oil of origanum, one and one-fourth ounce; tincture of capsicum, one and one-fourth ounce; tincture of guaiacum, one and one-fourth ounce; sulphuric ether, one and one-fourth ounce. Said ingredients are mixed together, after which the resulting compound is ready for use.

The above-described compound may be used externally to advantage in two cases—neuralgia and rheumatism—but is more especially adapted for use internally. The preparation is good for the stomach in cases of sick-headache, and in dyspepsia it stimulates the stomach to a healthy action. The kidneys are strengthened, taking away all mucous secretions that may gather in these organs. The ducts and absorbing vessels of the liver are opened up, and thus gall stone is believed to be prevented.

I claim and desire to secure by Letters Patent—

The compound consisting of alcohol, spirits of turpentine, spirits of camphor, aqua-ammonia, tincture of opium, chloroform, tincture of ginger, oil of sassafras, balsam of fir, essence of peppermint, oil of black pepper, oil of origanum, tincture of capsicum, tincture of guaiacum, and sulphuric ether, in about the proportions specified.

In testimony that I claim the foregoing as my own I have hereto affixed my signature in presence of two witnesses.

GEORGE WASHINGTON CHRISTOPHER.

Witnesses:
J. F. KINDRED,
W. W. BRIDGES.